US005384664A

United States Patent [19]
Koehler

[11] Patent Number: 5,384,664
[45] Date of Patent: Jan. 24, 1995

[54] COMBINED RECORDING OF MAGNETIC DATA AND OPTICAL GUIDE TRACK ON PHOTOGRAPHIC FILM

[75] Inventor: Steven F. Koehler, Rochester, N.Y.

[73] Assignee: Eastman Kodak Company, Rochester, N.Y.

[21] Appl. No.: 996,769

[22] Filed: Dec. 23, 1992

[51] Int. Cl.⁶ ............................................. G11B 31/00
[52] U.S. Cl. ...................................................... 360/3
[58] Field of Search ..................... 360/1, 3, 4, 76, 77, 360/75, 107, 109; 369/13, 284; 352/44, 92, 236, 239; 354/76, 109, 105, 106

[56] References Cited

U.S. PATENT DOCUMENTS

| | | | |
|---|---|---|---|
| 4,176,381 | 11/1979 | de Niet et al. | 360/77 |
| 4,355,748 | 10/1982 | Willenbring | 226/67 |
| 4,392,163 | 7/1983 | Rijckaert et al. | 360/76 |
| 4,633,451 | 12/1986 | Ahn et al. | 369/14 |
| 4,677,505 | 6/1987 | Nukada et al. | 360/77 |
| 4,852,077 | 7/1989 | Clark et al. | 369/284 |
| 4,881,090 | 11/1989 | Signoretto | 354/105 |
| 4,961,086 | 10/1990 | Takenaka | 355/41 |
| 4,996,546 | 2/1991 | Pagano et al. | 354/76 |
| 5,005,031 | 4/1991 | Kelbe | 354/106 |
| 5,161,135 | 11/1992 | Saito et al. | 369/13 |

FOREIGN PATENT DOCUMENTS

| | | | |
|---|---|---|---|
| 0433019 | 12/1990 | European Pat. Off. | G03B 17/24 |
| 9004212 | 10/1989 | WIPO | G03C 11/00 |
| 9222004 | 5/1992 | WIPO | G03B 17/24 |

Primary Examiner—Donald Hajec
Assistant Examiner—Le Thien Minh
Attorney, Agent, or Firm—David A. Hall

[57] ABSTRACT

In a photographic camera, a combined light source/magnetic head writes data into a magnetic recording material of a photographic filmstrip in a data track and exposes a guide track in a predetermined location relative to the data track during advancement of the filmstrip. The filmstrip is advanced past the combined light source/magnetic head and the light source is energized to optically expose the guide track while the magnetic head is operated to write the data. After processing of the filmstrip, the guide track is made visible. A processor can receive the filmstrip and use the guide track to properly position a magnetic read head in proper relation to the recorded data track to retrieve the data.

19 Claims, 3 Drawing Sheets ten into the MOF layer, the filmstrip is processed to develop the latent images. The processing does not alter the recorded data, which can be retrieved by printers, scanning equipment, and other systems provided with suitable magnetic read heads. The recording of data into an MOF layer of a photographic filmstrip is described, for example, in U.S. Pat. No. 4,975,732 to Robison et al.

COMBINED RECORDING OF MAGNETIC DATA AND OPTICAL GUIDE TRACK ON PHOTOGRAPHIC FILM

BACKGROUND OF THE INVENTION

1. Field of the Invention

The present invention relates generally to recording data on photographic film and, more particularly, to writing data on a recordable photographic filmstrip and reading data from such a filmstrip.

2. Description of the Related Art

In typical cameras, a photographic filmstrip is withdrawn from a film cartridge, advanced past a rectangular exposure gate as frames of latent images are exposed, and wound up on a take-up spool until all potential frames of the filmstrip are exposed. Thereafter, the filmstrip is rewound into the film cartridge and the cartridge is removed for processing the frames of latent images to form positive transparencies or, in the case of photographic negative film, to form negatives for the printing of positive, enlarged prints therefrom.

In many cases, it is desirable to know data concerning the exposed frames. For example, the photographer may want to record exposure information such as shutter time, aperture opening, and the like. Such exposure information could be helpful in producing prints from the filmstrip. Exposure information can be used by a photographic printer in determining proper printer parameters, such as color balance and exposure time, to produce more pleasing prints and in making re-order prints the same as originals. Also, the photographer may want to record the date of taking the photograph.

Exposure information, date information, and other such data also can be used advantageously for other related photographic purposes. For example, automated printer systems are available that electronically scan the frames of a developed filmstrip to derive a set of digitized video image data. The video image data is processed to display a positive video image that approximates the color balance and brightness of the print that will be obtained. The exposure information can be helpful in processing the video image data and other data, such as the date and identification, can be incorporated into the finished prints. More recently, systems have been developed for scanning and digitizing the frames of developed filmstrips for transfer of the frames into other media, such as a compact disc (CD) format, for use in video CD display systems. These transfer processes can utilize the exposure information to good advantage.

One technique for recording photographic data for the uses described above is to write the data into a recording material provided on a recordable photographic filmstrip. A recordable photographic filmstrip generally comprises a photographic filmstrip with a magnetic recording material that is deposited on the filmstrip or is integrally formed with the film emulsion or substrate. The magnetic recording material typically is deposited in a thin transparent layer over the entire surface of the photographic filmstrip and is referred to as the magnetics-on-film (MOF) layer. As frames are exposed in the camera, one or more magnetic heads write the data into the MOF layer in longitudinal data tracks that typically extend along one edge of the filmstrip outside of the frames.

After all frames of the recordable filmstrip are exposed with latent images and the associated data is written into the MOF layer, the filmstrip is processed to develop the latent images. The processing does not alter the recorded data, which can be retrieved by printers, scanning equipment, and other systems provided with suitable magnetic read heads. The recording of data into an MOF layer of a photographic filmstrip is described, for example, in U.S. Pat. No. 4,975,732 to Robison et al.

Such data recording techniques are convenient because the data is written into the MOF layer adjacent to the photographic frame with which it is associated and therefore is not likely to become separated or lost. Therefore, the data is readily available and can be quickly retrieved. Moreover, the photographer need not take any special action to record the data, as the recording of data into the MOF layer ordinarily is automatically carried out by the camera. Finally, additional information can be written into the MOF layer after the original exposure and processing. For example, the digitized video image data associated with a frame can be written into the MOF layer adjacent the frame.

In cameras that record data into the MOF layer of a recordable photographic filmstrip, a magnetic write head typically is provided in the film path of the camera adjacent the film gate for writing the data into the MOF layer. Accordingly, a system that is to retrieve the data after the filmstrip has been developed, such as a printer or digitizing processor, must include a magnetic read head. Thus, cameras must write the data into tracks in the MOF layer at predetermined locations of the filmstrip to record the data and processors must precisely locate and follow the data tracks in the MOF layer to read the data. Therefore, the magnetic heads must be positioned accurately to ensure correct writing and reading of the data.

Conventionally, the data is written by a data recording camera having a magnetic write head that is located a predetermined distance from the film edge and is read by a processor having a reading assembly that includes a magnetic read head and a guide plate that is located a predetermined distance from the magnetic read head. In the processor, during the printing or digitizing of the developed frames, the guide plate physically presses against the edge of the filmstrip to position the magnetic read head at the predetermined distance from the edge, where the data tracks were written. The filmstrip is kept under tension in the printer and therefore is held substantially taut against the pressure of the guide plate.

Unfortunately, pressing the guide plate of the reading assembly against the filmstrip edge can damage the filmstrip. Moreover, the filmstrip is relatively thin and therefore somewhat flexible, such that the position of the magnetic head can move slightly as the guide plate is pressed against the filmstrip, even though the filmstrip is held substantially taut. Hence, pressing the guide plate against the filmstrip does not consistently position the read head with great accuracy. These problems make it difficult to obtain consistent and accurate data recording. Such problems tend to be exacerbated as the filmstrip ages. In addition, adapting the printer to write supplemental data into the MOF layer is made less practical with potentially inaccurate positioning of the read/write head assembly. Finally, mechanical guide plates can effectively limit the processing speed of printers because the film damage and inaccurate positioning generally must be decreased by reducing the speed of the filmstrip through the printer.

From the discussion above, it should be apparent that there is a need for a data recording system that can accurately and consistently write data into tracks at a predetermined location in a recordable photographic filmstrip and then read such data from those tracks without damaging the filmstrip. The present invention satisfies this need.

SUMMARY OF THE INVENTION

In accordance with the invention, data is recorded in tracks along the length of a recordable photographic filmstrip of a camera in a predetermined location relative to frames of latent images while a guide track is contemporaneously optically exposed along the length of the filmstrip in predetermined relation to the data tracks. After the film is processed, the guide track is visible and can be used to guide a processor read head as it reads the data tracks. A camera constructed in accordance with the invention writes data in one or more tracks in a photographic filmstrip during advancement of the filmstrip from one latent image frame to the next and includes a light source that optically exposes a guide track on the filmstrip in predetermined relationship to the data tracks, contemporaneously with the recording of data in the data tracks. In this way, the guide track is located at a predetermined distance from the data tracks in a parallel relationship. Thus, a processor can accurately read the data by using the guide track to optically position the read head rather than by using a guide plate to press against the filmstrip edge.

In one aspect of the invention, there is described a method of writing data into a recording material of a photographic filmstrip in predetermined location relative to latent images exposed onto the photographic filmstrip, the method comprising the steps of advancing the photographic filmstrip from one latent image frame to the next writing the data into the recording material, in at least one data track that extends along the length of the filmstrip, during the step of advancing the filmstrip; and optically producing a guide track in the photographic filmstrip that extends along the length of the filmstrip, in predetermined location relative to the data track, during the step of advancing the photographic filmstrip.

In another aspect of the invention, there is described a data recording camera that can write data onto a recordable photographic filmstrip, placed in a film pathway of the camera, in a predetermined location relative to a frame of a latent image exposed onto the filmstrip, the camera comprising shutter means for directing light onto the filmstrip and exposing a latent image frame of the photographic filmstrip, drive means for advancing the filmstrip from the exposed frame during a time interval after the shutter means has indicated the exposure of the frame, write means for writing data into the photographic filmstrip in at least one data track during the time interval when the drive means advances the filmstrip, and light means for optically producing a guide track in the filmstrip during the time interval when the drive means advances the filmstrip from the frame.

Other features and advantages of the present invention should be apparent from the following description of the preferred embodiments, which illustrate, by way of example, the principles of the invention.

DESCRIPTION OF THE PREFERRED EMBODIMENTS

Figure 1:
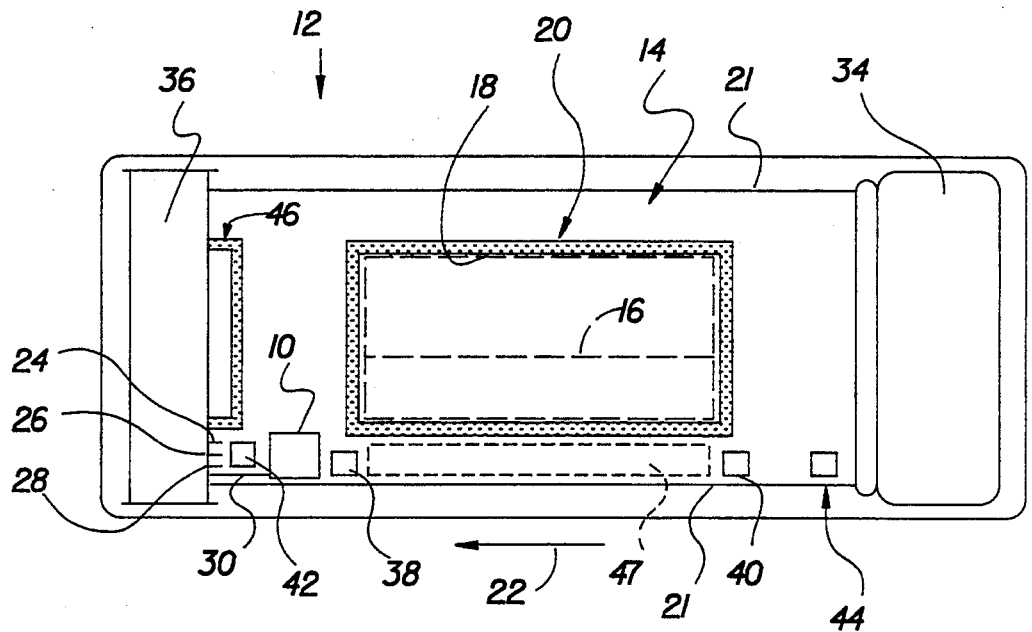
FIG. 1 is a schematic plan view of a data recording camera constructed in accordance with the present invention.

Turning now to FIG. 1, a write head 10 is shown schematically at the open back of a camera 12 in relation to a recordable photographic filmstrip 14. A shutter 16 permits light to pass through an exposure gate 18 (both illustrated schematically by dashed lines) and to be directed onto the filmstrip, exposing a latent image at a frame 20. After each exposure, the camera advances the filmstrip 14 in a forward direction along a film pathway 21 from one frame to the next, in the direction of the arrow 22, and the write head 10 both magnetically writes data into a plurality of data tracks 24, 26, 28 of the filmstrip and optically exposes an elongated guide track 30 into the filmstrip in a predetermined location relative to the data tracks. Those skilled in the art will appreciate that the guide track initially is a latent image that is not visible. After the filmstrip is processed, the guide track 30 becomes visible and can be followed by optical read heads known to those skilled in the art. Such read heads can follow an optical track without making physical contact with the filmstrip, thereby eliminating the need for a guide plate and decreasing the chance of damaging the filmstrip.

In the preferred embodiment, the filmstrip 14 extends from a film supply cartridge 34 past the exposure gate 18 to a film take-up spool 36. Perforations 38, 40, and 42 are disposed along the lower edge 44 of the filmstrip. The first perforation 38 defines the leading edge of a frame 20 of the filmstrip and a second perforation 40 defines the trailing edge of the frame. It is to be understood that the perforations and frame areas are repeated along the length of the filmstrip 14. For example, the left-most perforation 42 corresponds to the trailing edge of a preceding exposed frame 46. A recording area 47 extends between the first and second perforations 38 and 40, respectively, of the frame 20 and provides a location in which data can be magnetically written. Similarly, a data recording area extends between perforations elsewhere on the filmstrip, generally adjacent each frame area 20, 46. The filmstrip is advanced in a forward direction from right to left of FIG. 1, in the direction of the arrow 22, during the initial loading of the filmstrip 14 and supply cartridge 34, and following each exposure of a frame, by a motorized film drive system of the camera 12.

Figure 2:
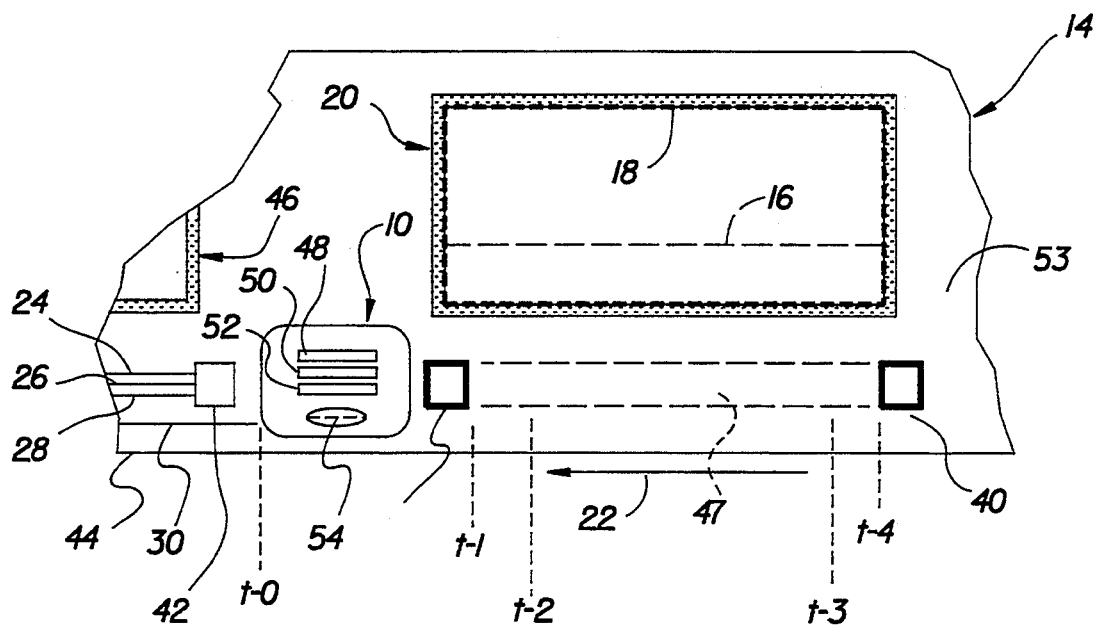
FIG. 2 is a schematic plan view of the combined magnetic/optical write head illustrated in FIG. 1.
Figure 3:
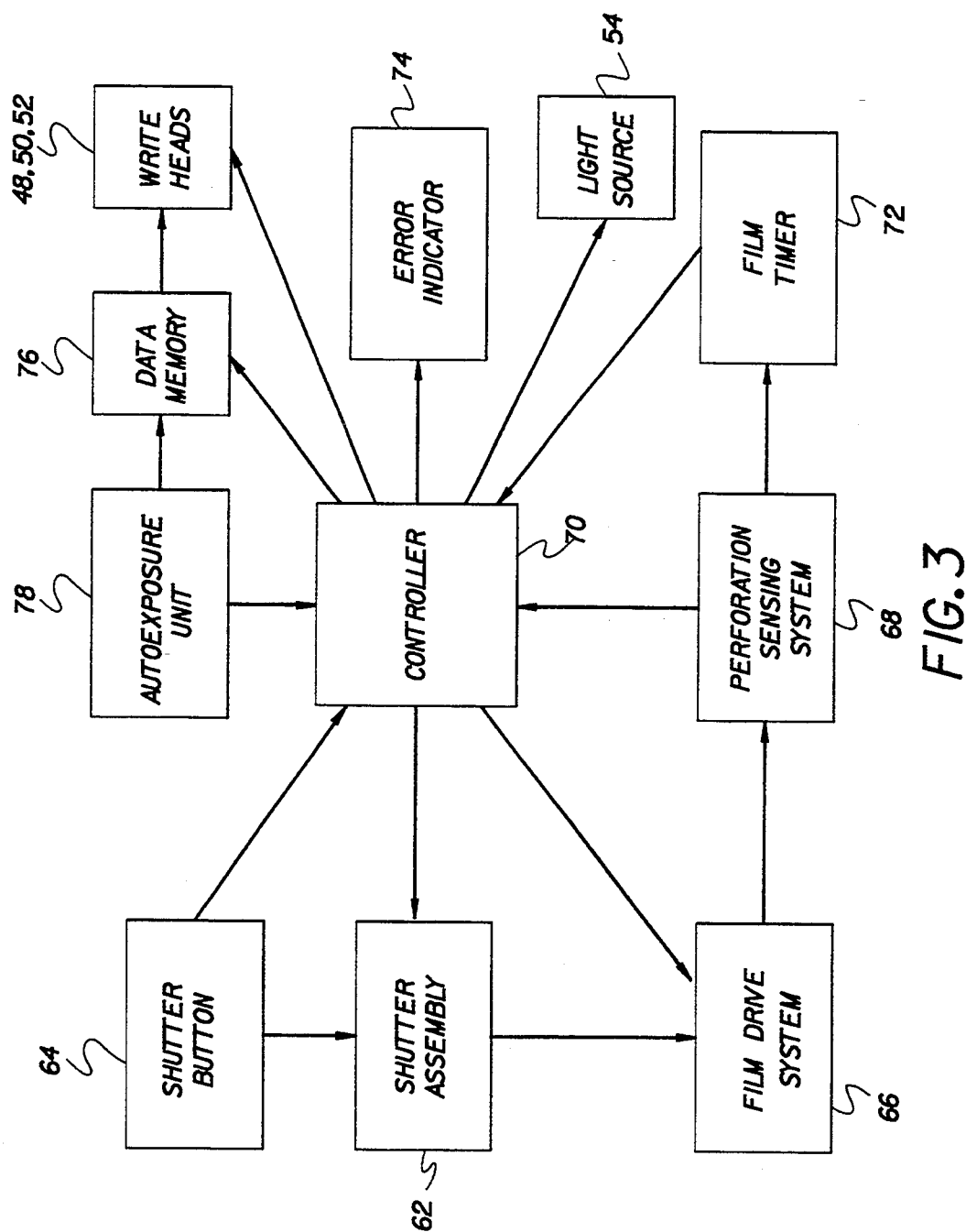
FIG. 3 is a block diagram of the camera illustrated in FIG. 1.
Figure 4:
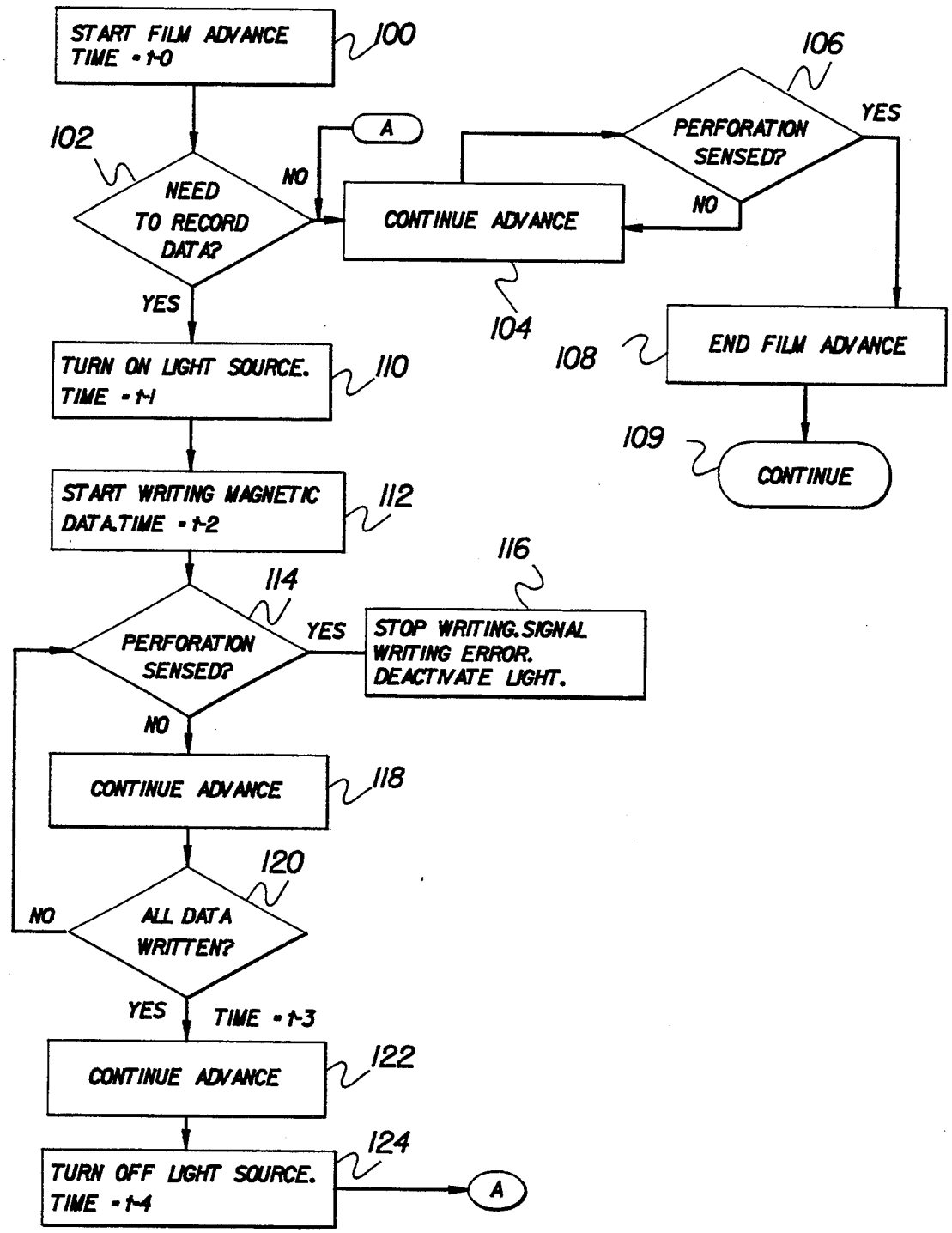
FIG. 4 is a simplified flow chart of the method for writing the data as carried out by the camera illustrated in FIG. 1.

FIG. 2 illustrates in greater detail the manner in which data is recorded in tracks within the recording area 47 during advancement of the filmstrip 14 past the write head 10. The block diagram of FIG. 3 illustrates the elements used to carry out the recording and the flow chart of FIG. 4 illustrates the steps of the recording as the filmstrip is advanced from one frame to the next.

The write head 10 preferably is a combined magnetic write head and light source assembly that includes an array of three magnetic write head elements 48, 50, 52 and also includes a light source 54 that is placed in a predetermined location relative to the write head elements. The light source may comprise, for example, a light emitting diode and lens assembly that emits a highly focused beam of light sufficiently intense that it exposes a narrow latent image along the lower edge 44 of the filmstrip 14 when the light source is energized. The three magnetic write head elements 48, 50, 52 write data in the three data tracks 24, 26, 28, respectively, in the filmstrip.

In the preferred embodiment, the recordable photographic filmstrip comprises a filmstrip having a thin transparent layer of magnetic recording material deposited over the entire surface of the filmstrip. This layer is referred to as the magnetics-on-film (MOF) layer 56. For each frame 20 exposed with a latent image, the optical guide track 30 thus falls generally within the recording area 47 between the perforations 38, 40 associated with a frame. Other suitable techniques for providing magnetic recording material in the recording area can be used and will be known to those skilled in the art. It will be understood that the MOF layer 53 may extend continuously or intermittently along the length of the filmstrip 14. Thus, it also will be understood that the data recording area 47 can extend upward toward the frame 20 and can extend downward toward the lower edge 44 of the filmstrip.

In accordance with the invention, the optical guide track 30 can be used to align a magnetic read head of associated photographic processing and printing equipment with the data tracks 24, 26, 28. In the absence of the optical guide track, tracking errors can occur through misalignment of the read head and damage to the filmstrip can occur through the use of guide plates. In accordance with the invention, the write head 10 is located in the camera 12 in the position shown generally in FIG. 1 such that the light source 54 is located in a predetermined position relative to the magnetic write head elements 48, 50, and 52. In this way, slight misalignment of the filmstrip 14 and the write head 10 does not affect the ability of the magnetic write head elements to record data in the MOF layer 56 and does not affect the ability to read the data thereafter. Only the relative distances between the light source 54 and the magnetic write head elements 48, 50, 52 must be controlled precisely so that the recorded magnetic tracks 42, 44, 46 and the optical guide track 30 are consistently spaced apart as depicted in FIG. 2. It will be appreciated that, for purposes of illustration, the relative lengths, sizes, and shapes of the optical guide track 30 and the magnetic tracks 22, 24, 26 in the filmstrip 14 have been exaggerated and are not necessarily to scale with respect to the dimensions of the filmstrip or the distance between the perforations 38 and 40.

FIG. 3 is a block diagram that illustrates the primary components of the camera 12 shown in FIG. 1. The camera includes a shutter assembly 62 that responds, for example, to the pressing of a shutter button 64 by momentarily opening the shutter 16, thereby permitting light to enter the camera and directing light onto the filmstrip 14 to expose a frame 20 of a latent image on the filmstrip. Shortly after the shutter assembly has exposed a frame, a film drive system 66 advances the filmstrip from the frame so that a fresh, unexposed portion of the filmstrip is placed in proper position relative to the exposure gate 18 and shutter assembly 62 for the next frame to be exposed. As the filmstrip is advanced, the magnetic write head elements 48, 50, 52 write the data tracks 24, 26, 28 into the filmstrip and the light source 54 optically exposes the guide track 30 onto the filmstrip in a parallel path adjacent the data tracks.

Preferably, the film advancement is controlled by a perforation sensing system 68, which senses perforations in the photographic filmstrip 14 that define the bounds of the filmstrip area on which a frame can be exposed and into which data can be written. A controller 70 can indicate an error condition if a trailing perforation indicates the termination of a frame area and data writing has not been completed. The controller also controls the various operations of the camera 12, such as detecting an exposure, advancing the filmstrip, and activating the write head elements and light source.

The time necessary to advance the filmstrip 14 from one exposed frame to the next should be substantially constant. This time ordinarily is sufficient to record all the data into the recording area 47 of the filmstrip. In addition, however, a film timer 72 can be set such chat the controller 70 indicates an error condition if either the time interval necessary to reach a trailing perforation or the time interval necessary to complete writing the data is exceeded. The camera 12 includes an error indicator 74 that is activated when an error condition is to be indicated.

When data is to be written into the recording area 47 of the photographic filmstrip 14, the data is temporarily stored in a data memory 76. This data can comprise, for example, the date of taking the exposure, the frame number exposed, exposure data, printing data, and the like. The exposure data preferably is provided by an automatic exposure unit 78 of the camera 12.

FIG. 4 shows the steps in writing the data into a recordable photographic filmstrip 14 with respect to the time indications illustrated in FIG. 2. In the preferred embodiment, filmstrip advancement upon taking an exposure extends from the beginning of advancement at time t-0 to the end of advancement with detection of the trailing perforation 40 at time t-4. The FIG. 4 flowchart assumes a substantially constant overall time period of filmstrip advancement extending from time t-0 to time t-4. Those skilled in the art, however, will appreciate that the filmstrip advancement involves a rapid initial acceleration at the start of advancement at time t-0 through a time t-1, which advances the leading perforation 38 past the magnetic write head elements 48, 50, 52. At time t-1, the speed of the filmstrip 14 is substantially constant, so that the filmstrip is thereafter advancing at a substantially constant speed past the write head elements.

With reference to FIGS. 2 and 4, at the outset of film advancement at t-0 in FIG. 2 and in block 100 of FIG. 4, the controller 70 commands the shutter assembly 62 to open the shutter 16 and commands the film drive system 66 to begin the initial acceleration and advance the filmstrip 14. Next, at block 102, the controller checks to determine if there is a need to record data. If a frame has been exposed, then the controller determines that there is a need to record data. The data is written into the data recording area 47, as described further below. If no frame has been exposed, then the controller determines that there is no need to record data and assumes that the filmstrip is at a leader portion. Therefore, the controller commands the film drive system 66 to continue the film advancement at block 104 until a perforation is sensed at block 106.

When the perforation sensing system 68 senses a perforation, film advancement is halted at block 108 and the controller 70 waits for a frame to be exposed at block 109. When a frame is exposed, film advancement is initiated once again at step 100 and processing proceeds as described. Thus, if a fresh filmstrip cartridge 20 has been loaded in the camera 12, the filmstrip will be advanced until a first perforation 38 is reached. This properly positions the filmstrip for exposing frames.

Returning to block 102, if a frame has been exposed, then the controller 70 determines that there is a need to store data as the filmstrip 14 is advanced. Therefore, the processing proceeds to block 110, which corresponds to time t-1. At time t-1, the light source 54 is activated. In this way, the light source exposes a latent image of the optical guide track 30 in the filmstrip as the filmstrip is advanced. At or before time t-1, the data to be recorded in the recording area 47 of the filmstrip 14 is temporarily stored in the data memory 74. The data may comprise, for example, data relating to the frame exposure, frame number, date, camera identification, and the like.

At a time substantially contemporaneous with activation of the light source 54 or shortly thereafter, approximately at time t-2 (block 112), the magnetic write head elements 48, 50, 52 are provided with data signals from the data memory 74 and commence writing the data tracks 24, 26, 28 into the filmstrip 14 as the filmstrip continues to be advanced. The data recording area 47 at each frame 20 is sized to provide a sufficient area in which to record the desired data. Providing multiple magnetic write head elements permits a greater amount of data to be written in the recording area than would be permitted by a single write head element. Thus, it should be understood that a lesser or greater number of write head elements can be provided, depending on the amount of data to be written.

If the data writing operation (block 112) for a particular frame 20 associated with a first perforation 38 is not completed when the next perforation 40 is sensed, then an error should be indicated. Therefore, while data writing is in progress after block 112, the controller 70 continually checks for the presence of the next perforation 40 at block 114. If the next perforation is detected before data writing is completed, then the controller halts data recording, deactivates the light source 54, and indicates an error in block 116. If the next perforation is not detected before data writing is completed, then the controller continues with advancement of the filmstrip 14 and writing the data at block 118.

At block 120, the controller 70 checks to determine if all the data has been written. If all the data has not been written, then the controller continues to check for the next perforation 40 at block 114 and advance the filmstrip 14 at block 118. If all the data has been written, and the next perforation has not been detected, then the controller continues to advance the filmstrip 14 at block 122. Ordinarily, the writing of data is completed at approximately time t-3.

At time t-3, the controller 70 turns off the magnetic write head elements 48, 50, 52 and ends the data recording. The filmstrip 14 continues to be advanced at block 122. If desired, the controller can check at block 124 to determine if additional data remains to be written at time t-3 or can check to determine if the time set by the film timer 72 has expired. If additional data remains to be written or time has expired, the controller indicates an error condition, as with the processing described for block 116 when the next perforation is detected before all the data is written. At time t-4, which corresponds to block 126, the optical light source 54 is deactivated. In practice, the time t-4 may occur at substantially the same time as time t-3. Processing then continues with filmstrip advancement at block 104 until the next perforation 40 is detected at block 106, whereupon advancement is halted at block 108.

It should be understood that the recordable photographic filmstrip 14 can be provided with a single perforation for each frame 20. That is, the leading perforation 38 and trailing perforation 40 can be replaced with a single perforation that defines the trailing edge of a first frame and the leading edge of a second frame. Moreover, the filmstrip can be provided with regularly spaced perforations, for example, for use with sprocket-driven filmstrip advancement systems. Thus, the invention can be used with a wide variety of film advancement and perforation systems.

In addition to the operation described above, the light source 54 may be activated prior to the writing of data by the magnetic write head elements 48, 50, 52 and may continue after all of the data is recorded. In addition, the information recorded in the data tracks 24, 26, 28 may be recorded by either analog or digital recording techniques well-known to those skilled in the art, although digital recording may be preferred for simplicity in signal processing and to minimize noise and frequency shifting due to film advance speed variations of cameras and processing and printing equipment. Preferably, data synchronization signals are recorded on one of the magnetic data tracks to facilitate decoding of the data recorded in the other tracks. In this way, any variation in film advance speeds from camera to camera and from printer to printer should not introduce errors. The sequence depicted in FIG. 4 is repeated during the film advancement following each exposure of a frame 20 on the filmstrip 14 to record the data described above.

Although the recording of certain specific information relating to the exposure of the image frame in question have been suggested, it will be understood that the invention embraces all types of information that may be found useful in subsequent film processing, printing, displaying, or scanning.

The present invention has been described above in terms of presently preferred embodiments so that an understanding of the present invention can be conveyed. There are, however, many configurations for magnetic read/write head systems for photographic filmstrips not specifically described herein, but with which the present invention is applicable. The present invention should therefore not be seen as limited to the particular embodiments described herein, but rather, it should be understood that the present invention has wide applicability with respect to magnetic read/write head systems for photographic filmstrips in a variety of applications. All modifications, variations, or equivalent arrangements that are within the scope of the attached claims should therefore be considered to be within the scope of the invention.

I claim:

1. A method of writing data into a magnetic recording material of a photographic filmstrip in predetermined location relative to latent images exposed onto photographic emulsion on the photographic filmstrip, the method comprising the steps of:

advancing the photographic filmstrip from one latent image frame to the next;

writing the data into the magnetic recording material, in at least one data track that extends along the length of the filmstrip, during the step of advancing the filmstrip; and optically producing a latent image guide track in the photographic emulsion of the photographic filmstrip that extends along the length of the filmstrip, in a predetermined location relative to the data track, during the step of advancing the photographic filmstrip.

2. The method as defined in claim 1, wherein the step of optically producing the guide track comprises the step of energizing a light source directed onto the filmstrip and producing a latent image of an elongated track that extends along the length of the filmstrip.

3. The method as defined in claim 2 wherein the light source is energized continuously during the entire step of advancing the filmstrip.

4. The method as defined in claim 1, wherein the step of writing the data and the step of optically producing the guide track occur at least partially simultaneously.

5. The method defined in claim 1 wherein the step of optically producing the guide track begins at a first predetermined time after the step of advancing the filmstrip begins and is completed at a second predetermined time after the step of advancing the filmstrip begins.

6. The method as defined in claim 5 wherein the step of writing the data is begun at a third predetermined time after the step of advancing the filmstrip begins and is completed at a fourth predetermined time after the step of advancing the filmstrip begins.

7. The method as defined in claim 1 wherein the step of advancing the filmstrip and the step of optically producing the guide track are completed substantially simultaneously.

8. The method as defined in claim 1 wherein the step of advancing the photographic filmstrip includes the steps of:

detecting the exposure of a frame of the photographic filmstrip;

advancing the photographic filmstrip;

detecting a leading edge perforation of the filmstrip indicating the beginning of a next frame area; and halting the advancement of the photographic filmstrip.

9. The method as defined in claim 8 wherein the step of writing the data comprises the steps of:

beginning the writing of data onto the photographic filmstrip a first predetermined time interval after the beginning of the step of advancing the photographic filmstrip; and completing the writing of data onto the photographic filmstrip a second predetermined time interval after the beginning of the step of advancing the photographic filmstrip.

10. The method as defined in claim 9 wherein the step of optically producing the guide track begins with the beginning of the first predetermined time interval and ends with the completion of the second predetermined time interval.

11. The method as defined in claim 9 wherein the step of optically producing the guide track comprises energizing a light source directed onto the filmstrip beginning with the first predetermined time interval and continuing uninterrupted through the second predetermined time interval.

12. A method of writing data into a magnetically recordable layer on a photographic filmstrip having a series of frames of latent images exposed onto the photographic emulsion of the filmstrip, the method comprising the steps of:

advancing the photographic filmstrip;

detecting a leading perforation of the photographic filmstrip that defines the beginning of a first image frame area;

activating a light source directed onto the filmstrip and thereby producing a latent image in the photographic emulsion of an elongated track that extends along the length of the filmstrip;

beginning the writing of data into the filmstrip magnetically recordable layer a first predetermined time interval after the beginning of the step of advancing the photographic filmstrip;

completing the recording of data onto the filmstrip magnetically recordable layer a second predetermined time interval after the beginning of the step of advancing the photographic filmstrip;

deactivating the light source and detecting a trailing perforation of the filmstrip that defines the end of the first image frame area; and halting the advancement of the filmstrip.

13. A data recording camera that can write data onto a magnetically recordable layer on a photographic filmstrip, placed in a film pathway of the camera, in a predetermined location relative to a frame of a latent image exposed onto a photographic emulsion of the filmstrip, the camera comprising:

shutter means for directing light onto the filmstrip and exposing a latent image frame on the photographic emulsion of the photographic filmstrip;

drive means for advancing the filmstrip from the exposed frame during a time interval after the shutter means has indicated the exposure of the frame;

write means for writing data into the magnetically recordable layer of the photographic filmstrip in at least one data track during the time interval when the drive means advances the filmstrip; and light means for optically producing a latent image guide track in the photographing emulsion filmstrip during the time interval when the drive means advances the filmstrip from the frame.

14. The camera as defined in claim 13 wherein the write means further comprises a magnetic recording head that is located adjacent the film pathway.

15. The camera as defined in claim 13 wherein the light means optically produces the guide track simultaneously with the write means writing the data.

16. The camera as defined in claim 13 wherein the light means includes a source of infrared light.

17. The camera as defined in claim 13 wherein the light means produces the guide track such that the track extends along the photographic filmstrip parallel to and at a predetermined distance from the data track.

18. A data recording camera that can write data onto a magnetically recordable layer on a photographic filmstrip, placed in a film pathway of the camera, in a predetermined location relative to a frame of a latent image exposed onto the filmstrip, the camera comprising:

a shutter assembly that directs light onto the filmstrip to thereby expose a latent image frame of the photographic filmstrip;

a film drive system that advances the filmstrip in a forward direction from the exposed frame during a time interval after the shutter assembly has exposed the latent image frames; and a combined magnetic write/light source head including at least one magnetic write head element adapted to be energized to write data into the photographic filmstrip magnetically recordable layer in at least one data track during the time interval when the film drive system advances the filmstrip and including a light source adapted to be energized to optically produce a latent image of a guide track in the filmstrip during the time interval when the film drive system advances the filmstrip in a predetermined location relative to the data track.

19. Apparatus for writing data into a recordable photographic filmstrip in predetermined location relative to frames exposed onto the recordable photographic filmstrip, the apparatus comprising:

drive means for advancing the filmstrip from an exposed frame;

write means for recording the data in at least one data track in a recording material of the recordable photographic filmstrip as the drive means advances the filmstrip in a forward direction from the frame; and light means for producing a latent exposure of an elongated track that extends along the length of the filmstrip, parallel to the data track, substantially simultaneously with the recording of the data into the data track by the write means.

* * * * *